United States Patent Office 3,514,491
Patented May 26, 1970

---

3,514,491
DERIVATIVES OF 6-AMINOPENICILLANIC ACID AND OF 7-AMINOCEPHALOSPORANIC ACID
Stephen Hanessian and Gunter R. Schutze, Ann Arbor, Mich., assignors to Parke, Davis & Company, Detroit, Mich., a corporation of Michigan
No Drawing. Filed Oct. 13, 1967, Ser. No. 675,016
Int. Cl. C07d 99/16, 99/24
U.S. Cl. 260—239.1                                8 Claims

---

ABSTRACT OF THE DISCLOSURE 1a,7b - dihydro - 1H - cyclopropa[a]naphthalene - 1-carboxylic acid derivatives of 6-aminopenicillanic acid and of 7-aminocephalosporanic acid and various methyl, halogen, azido, amino, hydroxy, and methoxy derivatives thereof, and their production by (a) reacting 6-aminopenicillanic acid or 7-aminocephalosporanic acid with an appropriately substituted 1a,7b - dihydro-1H-cyclopropa[a]naphthalene-1-carboxylic acid or a reactive derivative thereof, especially the acid chloride; and (b) catalytically hydrogenating one of the azido derivatives to produce one of the amino derivatives. The compounds exist in both free acid and salt forms, and exhibit anti-bacterial activity, including activity against both penicillin-sensitive and penicillin-resistant strains of staphylococci.

---

SUMMARY AND DETAILED DESCRIPTION

The present invention relates to new amide compounds that are useful as pharmacological agents and to methods for their production. More particularly, the invention relates to new organic amide compounds having the formula

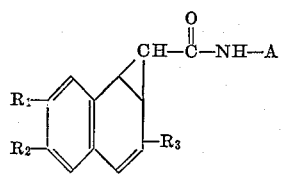

and to new organic amide compounds having the formula

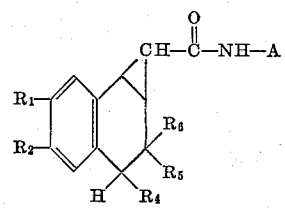

and to salts thereof; where each of $R_1$, $R_2$, and $R_5$ is hydrogen or methyl; $R_3$ is hydrogen, methyl, or bromine; $R_4$ is hydrogen, bromine, chlorine, azido($-N_3$), or amino; $R_6$ is hydrogen, bromine, chlorine, hydroxyl, or methoxyl; and A represents a group having the formula

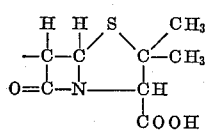

or a group having the formula

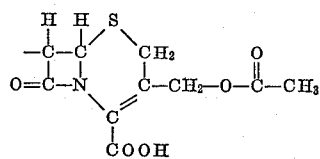

In accordance with the invention, the foregoing compounds are produced by reacting a carboxylic acid compound having the formula

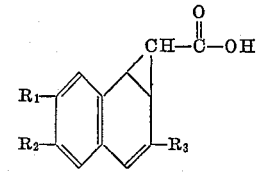

or a carboxylic acid compound having the formula

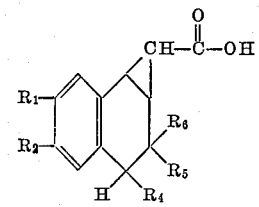

or a reactive derivative of either of these with an amine compound having the formula

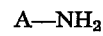

where $R_1$, $R_2$, $R_3$, $R_4$, $R_5$, $R_6$, and A all have the aforementioned significance. Some examples of suitable reactive derivatives of the carboxylic acid compounds represented by the above formulas are the acid halides, the azide, or an anhydride, including a mixed anhydride. The preferred reactant is an acid halide, especially the acid chloride. The carboxylic acid compound or its reactive derivative and the amine are normally employed in approximately equimolar quantities, although an excess of either can be used if desired. The reaction can be carried out in any of a number of unreactive solvents, including acetone, tertiary amides, such as N,N-dimethylformamide, and chlorinated hydrocarbons, such as dichloromethane and chloroform. The reaction medium may also contain added base to serve as an acid-binding agent. Such an added base is highly desirable in those cases where an acid halide is one of the reactants. Some examples of suitable bases for this purpose are pyridine, triethylamine, N-methylmorpholine, and sodium bicarbonate. A preferred solvent medium for the reaction is dichloromethane containing triethylamine as base. Depending on whether the free carboxylic acid or one of its reactive derivatives is used, the duration and temperature of the reaction can be varied widely. When the preferred acid chloride is employed, the reaction is best carried out at a temperature between —10 and 30° C. and, at this temperature, the reaction is substantially complete within 1 to 3 hours. The reaction is best carried out in such a way that the pH is held between 5 and 9 by the addition of the necessary amount of a base or a buffer solution. The product may be isolated either as the free acid or as a carboxylate salt by suitable adjustment of the pH. For example, the reaction mixture can be evaporated to dryness and the residue treated with acetone to separate and remove any insoluble material. The acetone solution containing the product is then evaporated to give a second residue, which is dissolved in water, and the aqueous solution is acidified to a pH of about 2 or 2.5. This acidic solution is extracted with ethyl acetate, and the ethyl acetate solution may be evaporated to give the product in the form of the free acid. Alternatively, the ethyl acetate solution may be treated with a suitable base, such as potassium 2-ethylhexanoate, and then concentrated to small volume and treated with ether to precipitate a carboxylate salt.

The carboxylic acid compounds and their reactive derivatives, which are required as starting materials in the foregoing process, can be prepared according to any of a variety of methods, as illustrated in greater detail hereinafter. A number of the carboxylic acid starting materials are known compounds, having been reported and described in the following: Chemische Berichte, vol. 94, p. 2332 (1961); Annalen der Chemie, vol. 646, p. 1 (1961); and Tetrahedron, vol. 15, p. 7 (1961). The heretofore unknown carboxylic acid compounds can, in general, be derived from the known acids by known methods, such as reduction and halogenation. The acid chlorides can be prepared by reacting a given acid with a suitable chlorinating agent, such as dimethyl chloromethyl ammonium chloride or thionyl chloride. Other reactive derivatives of the carboxylic acids can be prepared by employing general methods known in organic chemistry for converting a carboxylic acid to its functional derivatives.

Also in accordance with the invention, amide compounds having the formula

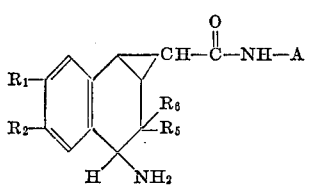

and salts thereof are produced by reacting a compound having the formula

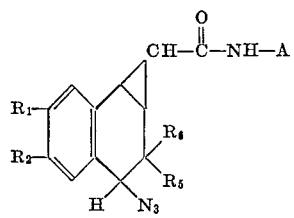

or a salt thereof with hydrogen in the presence of a hydrogenation catalyst in an unreactive solvent medium; where each of $R_1$, $R_2$, $R_5$, $R_6$, and A has the same meaning as previously given. Hydrogenation catalysts that may be used are the noble metals, platinum and palladium, which may optionally be supported on an inert carrier, that is, one that will not absorb the organic starting material, such as alumina, diatomaceous silica, or barium sulfate. A preferred catalyst is palladium on barium sulfate. Suitable solvents for the reaction include lower alkanols, water, and mixtures of these. Hydrogen is supplied to the reaction under pressure, which may vary from one to about 10 atmospheres. The temperature of the reaction is not especially critical and may be varied from about 0 to about 50° C. The time required for completion of the reaction will vary depending on the hydrogen pressure, amount of starting material, and temperature employed. With a hydrogen pressure of about 3–4 atmospheres at room temperature, the reaction is normally complete after several hours. The completion of the reaction can readily be determined by measuring the amount of hydrogen taken up. The required amount is one molecular equivalent. The product of the reaction may be isolated either as the free acid or as a carboxylate salt by suitable adjustment of the pH. When the starting material is used in free acid form, the product of obtained in free acid form directly from the reaction mixture or in carboxylate salt form by treatment of the reaction product mixture with a suitable base. When the starting material is a carboxylate salt, the direct product of the reaction is a corresponding salt, which may be converted to the free acid by acidification.

The free acids of the invention form carboxylate salts with any of a variety of inorganic and organic bases. Pharmaceutically-acceptable carboxylate salts are formed as indicated in the foregoing or by reacting the free acids with such bases as sodium hydroxide, sodium carbonate, sodium bicarbonate, potassium hydroxide, potassium carbonate, potassium 2-ethylhexanoate, calcium carbonate, ethylamine, 2-hydroxyethylamine, and procaine. Preferred carboxylate salt forms are the alkali metal salts. For formation of the potassium salt, a preferred base is potassium 2-ethylhexanoate, which gives a product having good physical form. The carboxylate salts are converted to the free acids by acidification. The free acids and their carboxylate salts differ somewhat in solubility properties but, in general, are otherwise equivalent for the purposes of the invention.

The compounds of the invention are new chemical compounds that are used pharmacological agents and especially antibacterial agents. They are active in vitro against a number of microorganisms, including *Strep. pyogenes* and both penicillin-sensitive and penicillin-resistant strains of staphylococci. Their activity in this regard is illustrated by that shown by potassium 6-(1a,7b-dihydro-1H-cyclopropa[a]-naphthalene - 1 - carboxamido)-3,3-dimethyl-7-oxo-4-thia-1-azabicyclo[3.2.0]heptane - 2-carboxylate. In an in vitro assay, the minimum inhibitory concentration of this compound of the invention against the penicillin-sensitive strain, *Staph, aureus* UC–76, was 6.3 micrograms/ml.; against the penicillin-resistant strain, *Staph. aureus* TU–12404, the minimum inhibitory concentration was 12.5 micrograms/ml.; and against *Strep. pyogenes* C–203, the minimal inhibitory concentration was 0.4 microgram/ml.

The compounds of the invention are also active in vivo against staphylococci. This activity is determined from acute single oral dose studies of a test compound against experimentally induced infections in mice. In these studies, each of a group of 10 mice is given a single oral dose of the test compound at the same time that each is infected, by intraperitoneal inoculation, with a dose of a test microorganism that is 100 times the mean lethal dose. The results in the test animals are then compared with the results in a group of 20 infected control animals, which receive no test compound, and with 10 control animals, which are treated with a standard dose of the known antibacterial agent, sulfadiazine. The activity of a test compound is expressed as the lowest dose that is effective in preventing death in half or more than half of the infected animals and is denoted as $PD_{50}$, mg./kg. In this test, the $PD_{50}$ of the compound named in the preceding paragraph, which is the preferred compound of the invention for this purpose, was found to be 14.8±2.9 mg./kg. against *Staph. aureus* UC–76.

The invention is illustrated by the following examples.

EXAMPLE 1

A solution of 0.37 g. of 1a,7b-dihydro-1H-cyclo propa [a]naphthalene-1-carboxyl chloride in 15 ml. of dichloromethane is added dropwise to a stirred mixture consisting of 0.42 g. of 6-aminopenicillanic acid, 0.7 ml. of triethylamine, and 7 ml. of dichloromethane maintained at 0–5° C. The reaction mixture is stirred for 2 hours after addition is complete, allowed to warm to 15° C., and then concentrated to near-dryness. The residue is treated with 20 ml. of acetone, and the resulting mixture is filtered to remove insoluble material. The filtrate is evaporated, the residue is dissolved in 15 ml. of water, and the aqueous solution is covered with 15 ml. of ethyl acetate. After adjustment of the pH to 2.2 with 10% cold sulfuric acid and after thorough mixing, the ethyl acetate phase is separated, and the aqueous phase is extracted once again with ethyl acetate. The ethyl acetate extracts are combined and dried over anhydrous sodium sulfate. A portion of this dried solution is evaporated to give a residue of the free acid, 6 - (1a,7b-dihydro-1H-cyclopropa[a]naphthalene-1-carboxamido) - 3,3 - dimethyl-7-oxo-4-thia-1-azabicyclo [3.2.0]heptane-2-carboxylic acid. The remainder of the dried ethyl acetate solution is treated dropwise with 1 ml. of a 50% solution of potassium 2-ethylhexanoate in butanol, and the resulting mixture is concentrated to a volume of about 5 ml. and diluted with ether until precipitation of the product is complete. The white solid is isolated by decantation of the liquid and is washed with ether and dried under reduced pressure over anhydrous calcium sulfate. This product is potassium 6-(1a,7b-dihydro-1H-cyclopropa[a]naphthalene - 1 - carboxamido)-3,3-dimethyl-7-oxo - 4 - thia-1-azabicyclo[3.2.0]-heptane-2-carboxylate; $[\alpha]_D^{25}+192°$ (1% in pyridine).

The coresponding sodium salt can be obtained in the foregoing general procedure by neutralizing the combined ethyl acetate extracts with dilute aqueous sodium carbonate, adding 15 ml. of water, and then separating and freeze-drying the aqueous phase. The sodium salt product is dried over phosphorus pentoxide. The corresponding calcium salt may be obtained in the same manner by substituting saturated aqueous calcium hydroxide for the aqueous sodium carbonate in the above neutralization step.

The 1a,7b-dihydro - 1H - cyclopropa[a]naphthalene-1-carboxyl chloride starting material is prepared as follows. To a stirred solution of 0.128 g. of dimethyl chloromethyl ammonium chloride in 10 ml. of dichloromethane, cooled to about 0° C., is added 0.186 g. of 1a,7b-dihydro-1H-cyclopropa[a]naphthalene-1-carboxylic acid, and the resulting mixture is stirred for one hour more at 0° C., allowed to warm to room temperature, and stirred for another hour. The mixture is then evaporated to dryness under reduced pressure, and the solid product obtained, which is the desired acid chloride starting material, is used immediately in the reaction described above without further purification.

EXAMPLE 2

A solution of 0.20 g. of 1a,7b-dihydro-1H-cyclopropa[a]naphthalene-1-carboxyl chloride in 10 ml. of dichloromethane is added dropwise to a stirred mixture consisting of 0.27 g. of 7-aminocephalosporanic acid, 0.28 ml. of triethylamine, and 10 ml. of dichloromethane maintained at 0–5° C. The reaction mixture is stirred for 2.5 hours after addition is complete, allowed to warm to 15° C., and then concentrated to near-dryness. The residue is treated as in Example 1 above to give potassium 7-(1a,7b-dihydro - 1H - cyclopropa[a]naphthalene - 1 - carboxamido)-3-acetoxymethyl-8-oxo - 5 - thia - 1 - azabicyclo-[4.2.0]oct-2-ene-2-carboxylate, which is dried over phosphorus pentoxide; $[\alpha]_D^{25}+96°$ (0.5% in pyridine).

The corresponding ammonium salt is obtained as follows. The procedure indicated above is followed through the acidification to pH 2.2 and until the product has been extracted into ethyl acetate. The ethyl acetate extract is then stirred with excess ethereal ammonia and the solid salt that precipitates is isolated and dried over phosphorous pentoxide.

In the procedure indicated above, evaporation to dryness of the ethyl acetate extracts that are obtained following the acidification to pH 2.2 gives a residue of the free acid, 7-(1a,7b - dihydro - 1H - cyclopropa[a]naphthalene-1-carboxamido) - 3 - acetoxymethyl-8-oxo-5-thia-1-azabicyclo-[4.2.0]oct-2-ene-2-carboxylic acid.

EXAMPLE 3

Utilizing a procedure analogous to that described in Example 1 above, the following compounds are obtained from reaction of the acid chloride compounds indicated below with 6-aminopenicillanic acid and subsequent treatment of the initial reaction product with potassium-2-ethylhexanoate. In each case, the optical rotation values given were determined on 1% pyridine solutions.

(a) From reaction of 1a,7b - dihydro - 2 - methyl-1H-cyclopropa[a]naphthalene-1-carboxyl chloride, there is obtained potassium 6-(1a,7b-dihydro-2-methyl-1H-cyclopropa[a]naphthalene-1-carboxamido) - 3,3 - dimethyl-7-oxo - 4 - thia-1-azabicyclo[3.2.0]heptane-2-carboxylate; $[\alpha]_D^{25}+246°$.

(b) From reaction of 1a,2,3,7b-tetrahydro-2-methyl-1H-cyclopropa[a]naphthalene-1-carboxyl chloride, there is obtained potassium 6-(1a,2,3,7b-tetrahydro-2-methyl-1H-cyclopropa[a]naphthalene-1-carboxamido) - 3,3 - dimethyl-7-oxo-4-thia-1-azabicyclo[3.2.0]heptane - 2 - carboxylate; $[\alpha]_D^{25}+226°$.

(c) From reaction of 1a,7b-dihydro-2,6-dimethyl-1H-cyclopropa[a]naphthalene - 1 - carboxyl chloride, there is obtained potassium 6-(1a,7b-dihydro - 2,6 - dimethyl-1H-cyclopropa[a]naphthalene - 1 - carboxamido) - 3,3 - dimethyl-7-oxo-4-thia-1-azabicyclo[3.2.0]heptane - 2 - carboxylate; $[\alpha]_D^{25}+265°$.

(d) From reaction of 1a,7b-dihydro-5,6-dimethyl-1H-cyclopropa[a]naphthalene - 1 - carboxyl chloride, there is obtained potassium 6-(1a,7b-dihydro - 5,6 - dimethyl-1H-cyclopropa[a]naphthalene - 1 - carboxamido) - 3,3 - dimethyl-7-oxo-4-thia-1-azabicyclo[3.2.0]heptane - 2 - carboxylate; $[\alpha]_D^{25}+259°$.

(e) From reaction of 1a,2,3,7b-tetrahydro-5,6-dimethyl - 1H-cyclopropa[a]naphthalene - 1-carboxyl chloride, there is obtained potassium 6-(1a,2,3,7b-tetrahydro-5,6-dimethyl - 1H - cyclopropa[a]naphthalene - 1 - carboxamido)-3,3-dimethyl-7-oxo - 4-thia - 1-azabicyclo[3.2.0] heptane-2-carboxylate; $[\alpha]_D^{25}+211°$.

(f) From reaction of 1a,7b-dihydro - 2 - bromo - 1H-cyclopropa[a]naphthalene - 1 - carboxyl chloride, there is obtained potassium 6 - (1a,7b-dihydro - 2-bromo - 1H-cyclopropa[a]naphthalene-1-carboxamido) - 3,3-dimethyl-7-oxo - 4-thia-1-azabicyclo[3.2.0]heptane - 2-carboxylate.

(g) From reaction of 1a,2,3,7b-tetrahydro-2,3-dibromo-1H-cyclopropa[a]naphthalene - 1-carboxyl chloride, there is obtained potassium 6-(1a,2,3,7b-tetrahydro - 2,3 - dibromo - 1H-cyclopropa[a]naphthalene - 1-carboxamido)-3,3-dimethyl - 7-oxo-4-thia - 1-azabicyclo[3.2.0]heptane-2-carboxylate.

(h) From reaction of 1a,2,3,7b-tetrahydro - 2,3-dibromo - 2-methyl - 1H-cyclopropa[a]naphthalene -1-carboxyl chloride, there is obtained potassium 6-(1a,2,3,7b-tetrahydro - 2,3-dibromo - 2-methyl - 1H-cyclopropa[a]naphthalene - 1-carboxamido) - 3,3-dimethyl - 7-oxo-4-thia - 1-azabicyclo[3.2.0]heptane-2-carboxylate; $[\alpha]_D^{25}+223°$.

(i) From reaction of 1a,2,3,7b-tetrahydro-2,3-dibromo-2,6-dimethyl - 1H-cyclopropa[a]naphthalene - 1-carboxyl chloride, there is obtained potassium 6-(1a,2,3,7b-tetrahydro - 2,3-dibromo - 2,6-dimethyl - 1H-cyclopropa[a]naphthalene - 1-carboxamido) - 3,3-dimethyl - 7-oxo-4-thia - 1-azabicyclo[3.2.0]-heptane - 2-carboxylate; $[\alpha]_D^{25}+226°$.

(j) From reaction of 1a,2,3,7b-tetrahydro-2,3-dibromo-5,6-dimethyl - 1H-cyclopropa[a]naphthalene - 1-carboxyl chloride, there is obtained potassium 6-(1a,2,3,7b-tetrahydro - 2,3-dibromo - 5,6-dimethyl - 1H-cyclopropa[a]naphthalene - 1-carboxamido) - 3,3-dimethyl - 7-oxo-4-thia - 1-azabicyclo[3.2.0]heptane - 2-carboxylate; $[\alpha]_D^{25}+182°$.

The procaine salt corresponding to the potassium salt product named in (c) of this example is obtained as follows. A solution of 0.11 g. of the potassium salt in 4 ml. of water is treated with a solution of 0.54 g. of procaine hydrochloride in 4 ml. of water, the resulting mixture is chilled at 0° C. for several hours, and the insoluble procaine salt of 6-(1a,7b-dihydro-2,6-dimethyl - 1H-cyclopropa[a]naphthalene - 1-carboxamido) - 3,3-dimethyl-7-oxo-4-thia - 1-azabicyclo[3.2.0]heptane-2-carboxylic acid is isolated by filtration. An additional quantity of this procaine salt can be precipitated by adding 2.0 g. of sodium chloride to the filtrate.

The preparation of the acid chloride starting materials required for the production of the compounds named above can be illustrated by the preparation of 1a,7b-dihydro-2-methyl - 1H-cyclopropa[a]naphthalene - 1-carboxyl chloride according to the following general procedure. A solution of 0.4 g. of 1a,7b-dihydro-2-methyl-1H-cyclopropa[a]naphthalene - 1-carboxylic acid and one drop of pyridine in 20 ml. of dichloromethane is treated with 0.2 ml. of thionyl chloride, and the resulting mixture is heated under reflux for two hours. The mixture is then evaporated to dryness to give the desired acid choride starting materal, obtained as a white solid, which is stored in vacuo over potassium hydroxide for 18 hours prior to use in the reaction indicated above.

EXAMPLE 4

Utilizing the general procedure described in Example 1 above, from reaction of 6-aminopenicillanic acid with 1a,2,3,7b-tetrahydro - 2,6-dimethyl-1H-cyclopropa[a]naphthalene - 1-carboxyl chloride and subsequent treatment of the initial product with potassium 2-ethylhexanoate, there is obtained potassium 6-(1a,2,3,7b-tetrahydro - 2,6-dimethyl - 1H-cyclopropa[a]naphthalene - 1-carboxamido)-3,3-dimethyl - 7-oxo-4-thia - 1-azabicyclo[3.2.0]heptane-2-carboxylate; $[\alpha]_D^{25}$ +188° (1% in pyridine).

The acid chloride starting material is prepared as follows. A mixture consisting of 0.635 g. of 1a,7b-dihydro-2,6-dimethyl - 1H-cyclopropa[a]naphthalene - 1-carboxylic acid, 0.11 g. of 5% platinum-on-carbon catalyst, and 75 ml. of methanol is shaken with hydrogen at a pressure of 50 lbs./in.² until no more hydrogen is absorbed. The mixture is then filtered to remove catalyst, and the filtrate is evaporated to give a residue of 1a,2,3,7b-tetrahydro-2,6-dimethyl - 1H-cyclopropa[a]naphthalene - 1-carboxylic acid; M.P. 168–171° C., following crystallization from methanol. This intermediate free acid product is then reacted with thionyl chloride according to the procedure described in Example 3 above to give the desired 1a,2,3,7b-tetrahydro - 2,6 - dimethyl - 1H-cyclopropa[a]naphthalene - 1-carboxyl chloride, suitable for use without further purification.

EXAMPLE 5

Utilizing the general procedure described in Example 1 above, from reaction of 6-aminopenicillanic acid with 1a,2,3,7b-tetrahydro - 2,3-dichloro - 1H-cyclopropa[a]naphthalene - 1-carboxyl chloride and subsequent treatment of the initial product with potassium 2-ethylhexanoate, there is obtained potassium 6-(1a,2,3,7b-tetrahydro-2,3-dichloro - 1H-cyclopropa[a]naphthalene - 1-carboxamido)-3,3-dimethyl - 7-oxo - 4-thia - 1-azabicyclo[3.2.0]heptane - 2-carboxylate.

The acid chloride starting material is obtained as follows. A solution of 1.86 g. of 1a,7b-dihydro - 1H-cyclopropa[a]naphthalene - 1-carboxylic acid in 30 ml. of chloroform is saturated with chlorine gas, and the reaction mixture is stirred for 30 minutes at room temperature. It is then evaporated to give a residue of 1a,2,3,7b-tetrahydro - 2,3-dichloro - 1H-cyclopropa[a]naphthalene - 1-carboxylic acid; M.P. 150–156° C., following crystallization from methanol. This intermediate free acid product is then converted into the desired acid chloride starting material by reaction with thionyl chloride, according to the general procedure described earlier.

EXAMPLE 6

Utilizing the general procedure described in Example 1 above, from reaction of 6-aminopenicillanic acid and 1a,2,3,7b - tetrahydro - 2,3 - dichloro - 2,6 - dimethyl - 1H-cyclopropa[a]naphthalene-1-carboxyl chloride and subsequent treatment of the initial product with potassium 2-ethylhexanoate, there is obtained potassium 6-(1a,2,3,7b-tetrahydro - 2,3 - dichloro - 2,6 - dimethyl-1H-cyclopropa[a]naphthalene - 1 - carboxamido) - 3,3 - dimethyl-7-oxo - 4 - thia - 1 - azabicyclo[3.2.0]heptane - 2 - carboxylate; $[\alpha]_D^{25}$ +188° C.

The acid chloride starting material required above is prepared by first reacting 1a,7b-dihydro-2,6-dimethyl-1H-cyclopropa[a]naphthalene-1-carboxylic acid with chlorine, in a manner analogous to that described in Example 5 above, to give 1a,2,3,7b-tetrahydro-2,3-dichloro-2,6-dimethyl-1H-cyclopropa[a]naphthalene-1-carboxylic acid, M.P. 94–110° C., and then converting this free carboxylic acid intermediate to the desired acid chloride starting material by reaction with thionyl chloride.

EXAMPLE 7

Utilizing the general procedure described in Example 1 above, from reaction of 6-aminopenicillanic acid with 1a,2,3,7b-tetrahydro - 2,3 - dichloro - 2 - methyl-1H-cyclopropa[a]naphthalene-1-carboxyl chloride and subsequent treatment of the initial product with potassium 2-ethylhexanoate, there is obtained potassium 6-(1a,2,3,7b-tetrahydro - 2,3 - dichloro - 2 - methyl - 1H - cyclopropa[a]naphthalene - 1 - carboxamido) - 3,3 - dimethyl - 7 - oxo-4-thia-1-azabicyclo[3.2.0]heptane-2-carboxylate.

The required acid chloride starting material is obtained by chlorinating 1a,7b-dihydro - 2 - methyl-1H-cyclopropa[a]naphthalene-1-carboxylic acid to give 1a,2,3,7b-tetrahydro-2,3-dichloro - 2 - methyl - 1H - cyclopropa[a]naphthalene-1-carboxylic acid and then reacting this free acid intermediate product with thionyl chloride, utilizing the procedure described earlier.

EXAMPLE 8

Utilizing the general procedure described in Example 1 above, from reaction of 6-aminopenicillanic acid with 1a,2,3,7b - tetrahydro - 2,3 - dichloro - 5,6 - dimethyl - 1H-cyclopropa[a]naphthalene-1-carboxyl chloride and subsequent treatment of the initial product with potassium 2-ethylhexanoate, there is obtained potassium 6-(1a,2,3,7b-tetrahydro - 2,3 - dichloro - 5,6 - dimethyl-1H-cyclopropa[a]naphthalene - 1 - carboxamido) - 3,3 - dimethyl-7-oxo-4-thia-1-azabicyclo[3.2.0]heptane - 2 - carboxylate; $[\alpha]_D^{25}$ +177°.

The required acid chloride starting material is obtained by chlorinating 1a,7b-dihydro - 5,6 - dimethyl-1H-cyclopropa[a]naphthalene-1-carboxylic acid to give 1a,2,3,7b-tetrahydro - 2,3 - dichloro - 5,6 - dimethyl - 1H - cyclopropa[a]naphthalene-1-carboxylic acid, M.P. 99–112° C., and then reacting this free acid intermediate product with thionyl chloride, utilizing procedures described earlier.

EXAMPLE 9

Utilizing the general procedure described in Example 1 above, from reaction of 6-aminopenicillanic acid with 1a,2,3,7b-tetrahydro - 2 - hydroxy - 3 - azido - 1H - cyclopropa[a]naphthalene-1-carboxyl chloride and subsequent treatment of the initial product with potassium 2-ethylhexanoate, there is obtained potassium 6-(1a,2,3,7b-tetrahydro - 2 - hydroxy - 3 - azido - 1H - cyclopropa[a]naphthalene - 1 - carboxamido) - 3,3 - dimethyl - 7 - oxo-4-thia-1-azabicyclo[3.2.0]heptane-2-carboxylate; $[\alpha]_D^{25}$ +122°.

The acid chloride starting material required above is prepared as follows. A solution of 2 g. of ethyl 1a,7b-dihydro - 1H - cyclopropa[a]naphthalene-1-carboxylate in 20 ml. of chloroform is cooled to −25° C., 2.2 g. of 85% metaperbenzoic acid is added, and the resulting mixture is kept for 6 days at −18° C., and then for one day more at 0° C. At the end of this time, the mixture is filtered and the filtrate is washed with dilute aqueous sodium bicarbonate and then evaporated to give a light yellow oily residue of ethyl 1a,2,3,7b-tetrahydro-2,3-epoxy-1H-cyclopropa[a]naphthalene - 1 - carboxylate, suitable for use in the following reaction without further purification. To this oily intermediate product (2 g.) is added 0.26 g. of sodium azide, 0.1 g. of ammonium chloride, and 40 ml. of 2-methoxyethanol containing one drop of water, and the resulting mixture is heated under reflux for 4 hours. Upon cooling, the mixture is evaporated to dryness to give ethyl 1a,2,3,7b-tetrahydro-2 - hydroxy - 3 - azido - 1H - cyclopropa[a]naphthalene-1-carboxylate, obtained as a pale yellow liquid that is suitable for further use without additional purification. To 0.18 g. of this second intermediate is carefully added a solution of 1.2 g. of potassium hydroxide in 15 ml. of methanol while the temperature is maintained at about 0° C. the resulting mixture is stirred for one hour and evaporated under reduced pressure. The residue is dissolved in a small volume of water, and the aqueous solution is acidified with 5% hydrochloric acid. The acidic solution is then extracted with ether and the ether extracts are combined, washed with water, dried, and evaporated to give 1a,2,3,7b-tetrahydro-2-hydroxy-3-azido-1H-cyclopropa[a]naphthalene-1-carboxylic acid, M.P. 180° C. This free acid intermediate product is converted to the desired acid chloride starting material by reaction with thionyl chloride, according to the general procedure described earlier.

EXAMPLE 10

Utilizing the general procedure described in Example 1 above, from reaction of 6-aminopenicillanic acid with 1a,2,3,7b-tetrahydro-2-hydroxy-2,6-dimethyl-3-azido-1H-cyclopropa[a]naphthalene-1-carboxyl chloride and subsequent treatment of the initial product with potassium 2-ethylhexanoate, there is obtained potassium 6-(1a,2,3,7b-tetrahydro-2-hydroxy-2,6-dimethyl-3-azido-1H-cyclopropa[a]naphthalene-1-carboxamido)-3,3-dimethyl-7-oxo-4-thia-1-azabicyclo[3.2.0]heptane-2-carboxylate; $[\alpha]_D^{25} +109°$.

The required acid chloride starting material is prepared by first reacting ethyl 1a,2,3,7b-tetrahydro-2,3-epoxy-2,6-dimethyl-1H-cyclopropa[a]naphthalene-1-carboxylate with sodium azide and ammonium chloride in 2-methoxyethanol containing one drop of water to give ethyl 1a,2,3,7b-tetrahydro-2-hydroxy-2,6-dimethyl-3-azido-1H-cyclopropa[a]naphthalene-1-carboxylate, next saponifying this ester intermediate with methanolic sodium hydroxide to give 1a,2,3,7b-tetrahydro-2-hydroxy-2,6-dimethyl-3-azido-1H-cyclopropa[a]naphthalene-1-carboxylic acid, M.P. 115–125° C., and then converting this free acid intermediate product to the desired acid chloride starting material by reaction with thionyl chloride, employing in each case a procedure analogous to that described in Example 9 above.

EXAMPLE 11

Utilizing the general procedure described in Example 1 above, from reaction of 6-aminopenicillanic acid with 1a,2,3,7b-tetrahydro-2-methoxy-3-azido-1H-cyclopropa[a]naphthalene-1-carboxyl chloride and subsequent treatment of the initial product with potassium 2-ethylhexanoate, there is obtained potassium 6-(1a,2,3,7b-tetrahydro-2-methoxy-3-azido-1H-cyclopropa[a]naphthalene-1-carboxamido)-3,3-dimethyl-7-oxo-4-thia-1-azabicyclo[3.2.0]heptane-2-carboxylate; $[\alpha]_D^{25} +173°$ (1.13% in pyridine).

The required acid chloride starting material is prepared as follows. To a mixture consisting of 2.73 g. of ethyl 1a,2,3,7b-tetrahydro-2-hydroxy-3-azido-1H-cyclopropa[a]naphthalene-1-carboxylate and 30 ml. of methyl iodide, heated under reflux, is added, in portions, 15 g. of silver oxide, and the reaction mixture is heated under reflux overnight. It is then evaporated to dryness, the residue is mixed with ether, and the ethereal mixture is filtered to remove insoluble material. The ethereal filtrate is treated with activated charcoal, dried, and evaporated to give ethyl 1a,2,3,7b-tetrahydro-2-methoxy-3-azido-1H-cyclopropa[a]naphthalene-1-carboxylate, obtained as a yellow oil that is suitable for subsequent reaction without further purification. To a solution of 2.1 g. of this intermediate product in 5 ml. of methanol, cooled to about 0° C., is added a solution of 0.56 g. of sodium hydroxide in 20 ml. of methanol, and the resulting mixture is stirred for 30 minutes more at 0° C. The mixture is then evaporated under reduced pressure, and the residue is treated with water. The aqueous mixture is washed well with ether and acidified with 5% hydrochloric acid. The acidic solution is extracted with ether, and the ether extracts are washed with water, dried, and evaporated under reduced pressure to give 1a,2,3,7b-tetrahydro-2-methoxy-3-azido-1H-cyclopropa[a]naphthalene-1-carboxylic acid, obtained as an orange oil, which is reacted with thionyl chloride, according to the procedure described earlier, to give the desired 1a,2,3,7b-tetrahydro-2-methoxy-3-azido-1H-cyclopropa[a]naphthalene-1-carboxyl chloride starting material.

EXAMPLE 12

A mixture consisting of 0.81 g. of potassium 6-(1a,2,3,7b-tetrahydro-2-methoxy-3-azido-1H-cyclopropa[a]naphthalene-1-carboxamido)-3,3-dimethyl-7-oxo-4-thia-1-azabicyclo[3.2.0]heptane-2-carboxylate, 75 ml. of methanol, and 1.75 g. of 10% palladium on barium sulfate is shaken at room temperature with hydrogen gas at an initial pressure of 50 lbs./in.$^2$. After the hydrogen pressure has dropped to 35 lbs./in.$^2$, the mixture is evaporated and the residue is treated with ether. The ethereal mixture is filtered to remove catalyst, and the filtrate is dried and evaporated under reduced pressure to give potassium 6-(1a,2,3,7b-tetrahydro-2-methoxy-3-amino-1H-cyclopropa[a]naphthalene-1-carboxamido)-3,3-dimethyl-7-oxo-4-thia-1-azabicyclo[3.2.0]heptane-2-carboxylate; $[\alpha]_D^{25} +142°$ (1% in pyridine).

We claim:
1. A member of the class consisting of amide compounds having the formula

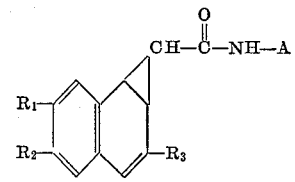

amide compounds having the formula

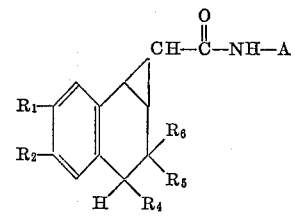

and pharmaceutically-acceptable salts thereof; where each of $R_1$, $R_2$, and $R_5$ is a member of the class consisting of hydrogen and methyl; $R_3$ is a member of the class consisting of hydrogen, methyl, and bromine; $R_4$ is a member of the class consisting of hydrogen, bromine, chlorine, azido, and amino; $R_6$ is a member of the class consisting of hydrogen, bromine, chlorine, hydroxyl and methoxyl; and A represents a member of the class consisting of a group having the formula

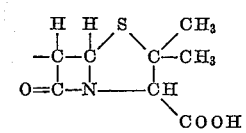

and a group having the formula

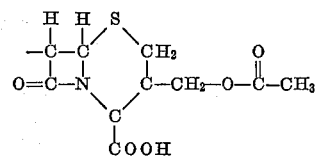

2. A compound according to claim 1 in the form of a free carboxylic acid.

3. A compound according to claim 1 in the form of an alkali metal salt.

4. A compound according to claim 1 which is potassium 6-(1a,7b-dihydro-1H-cyclopropa[a]naphthalene-1- carboxamido)-3,3-dimethyl-7-oxo-4 - thia - 1 - azabicyclo [3.2.0]heptane-2-carboxylate.

5. A compound according to claim 1 which is potassium 7-(1a,7b-dihydro-1H-cyclopropa[a]naphthalene - 1-carboxamido)-3-acetoxymethyl-8-oxo - 5 - thia - 1 - azabicyclo[4.2.0]oct-2-ene-2-carboxylate.

6. A compound according to claim 1 which is potassium 6-(1a,2,3,7b-tetrahydro-2,3-dibromo-1H-cyclopropa [a]naphthalene-1-carboxamido)-3,3-dimethyl-7 - oxo - 4-thia-1-azabicyclo[3.2.0]heptane-2-carboxylate.

7. A compound according to claim 1 which is potassium 6-(1a,2,3,7b-tetrahydro-2-hydroxy-2,6-dimethyl - 3-azido-1H-cyclopropa[a]naphthalene-1-carboxamido) - 3,3-dimethyl-7-oxo-4-thia-1 - azabicyclo[3.2.0]heptane - 2-carboxylate.

8. A compound according to claim 1 which is potassium 6-(1a,2,3,7b-tetrahydro-2-methoxy - 3 - amino - 1H-cyclopropa[a]naphthalene-1-carboxamido) - 3,3 - dimethyl-7-oxo-4-thia-1-azabicyclo[3.2.0]heptane-2-carboxylate.

References Cited
UNITED STATES PATENTS

| | | | |
|---|---|---|---|
| 3,252,971 | 5/1966 | Chow et al. | 260—239.1 |
| 3,278,524 | 10/1966 | Johnson et al. | 260—239.1 |

NICHOLAS S. RIZZO, Primary Examiner

U.S. Cl. X.R.

260—243, 999